US008946925B2

(12) United States Patent
Maltaverne et al.

(10) Patent No.: US 8,946,925 B2
(45) Date of Patent: Feb. 3, 2015

(54) OPERATING MODULE FOR AN ANTI-THEFT LOCK AND ASSOCIATED ANTI-THEFT LOCK

(75) Inventors: Frédéric Maltaverne, Créteil Cedex (FR); Fabrice Giacomin, Créteil Cedex (FR)

(73) Assignee: Valeo Securite Habitacle, Creteil Cedex (FR)

( * ) Notice: Subject to any disclaimer, the term of this patent is extended or adjusted under 35 U.S.C. 154(b) by 1061 days.

(21) Appl. No.: 13/002,740

(22) PCT Filed: Jul. 9, 2009

(86) PCT No.: PCT/EP2009/058739

§ 371 (c)(1),
(2), (4) Date: Aug. 25, 2011

(87) PCT Pub. No.: WO2010/004001

PCT Pub. Date: Jan. 14, 2010

(65) Prior Publication Data

US 2011/0298275 A1 Dec. 8, 2011

(30) Foreign Application Priority Data

Jul. 9, 2008 (FR) ..................................... 08 03912

(51) Int. Cl.

| | |
|---|---|
| ***B60R 25/00*** | (2013.01) |
| ***H01H 47/22*** | (2006.01) |
| ***E05B 17/22*** | (2006.01) |
| ***G07C 9/00*** | (2006.01) |
| *E05B 47/06* | (2006.01) |

(52) U.S. Cl.
CPC ............ *E05B 17/22* (2013.01); *G07C 9/00944* (2013.01); *E05B 47/0611* (2013.01)
USPC ........................................................ 307/10.2

(58) Field of Classification Search
USPC ............ 307/10.2, 10.3, 10.5, 10.6; 340/426.3
See application file for complete search history.

(56) References Cited

U.S. PATENT DOCUMENTS

| | | | | |
|---|---|---|---|---|
| 5,836,187 | A | 11/1998 | Janssen et al. | |
| 2005/0012593 | A1 | 1/2005 | Harrod et al. | |
| 2007/0284943 | A1 * | 12/2007 | Meeks | 307/10.3 |

FOREIGN PATENT DOCUMENTS

| | | | |
|---|---|---|---|
| DE | 198 42 224 | A1 | 4/2000 |
| EP | 1 145 925 | A1 | 10/2001 |

OTHER PUBLICATIONS

International Search Report w/translation from PCT/EP2009/058739 dated Sep. 22, 2009 (4 pages).

* cited by examiner

*Primary Examiner* — Carlos Amaya
(74) *Attorney, Agent, or Firm* — Osha Liang LLP

(57) ABSTRACT

The invention relates to an operating module for a vehicle anti-theft lock comprising a stator and a rotor that can be turned in the stator by a conforming key comprising an electronic identifier, the said module comprising a support (3) intended to be mounted on the stator and carrying an antenna (5) intended to be connected to an identification unit capable of authenticating the electronic identifier of the said key by exchanging signals, and authorizing the starting of the vehicle when an authorized identifier has been detected. According to the invention, the said support (3) further carries at least one contactless switch (7A, 7B) that can be switched by the rotor when the rotor is turned. The invention also relates to a vehicle anti-theft lock comprising a stator and a rotor that can be turned in the stator and comprising an operating module according to the invention.

10 Claims, 2 Drawing Sheets

OPERATING MODULE FOR AN ANTI-THEFT LOCK AND ASSOCIATED ANTI-THEFT LOCK

CROSS-REFERENCE TO RELATED APPLICATIONS

The present application is a PCT national phase application of PCT/EP2009/058739, filed Jul. 9, 2009, which claims priority to French Patent Application No. FR0803912, filed Jul. 9, 2008, the contents of which are incorporated herein in their entirety.

BACKGROUND

1. Field of the Invention

The present invention relates to a control module and a motor vehicle antitheft device equipped with such a module.

2. Related Art

An antitheft lock conventionally comprises a stator and a rotor able to be rotationally driven in the stator, for example by means of a conforming key.

There is already known in the state of the art an identification device including in particular an electronic identifier carried by the user, for example in the conforming key, and a unit for identifying an electronic identifier of an authorized key by means of an antenna fixed on the stator. When an authorized key is detected, the starting of the vehicle is authorized.

To control the starting of the vehicle, the rotor then switches a switch after having been rotationally moved by the authorized conforming key, the switch being in a known manner fixed on the stator of the lock.

SUMMARY

This implementation exhibits the drawback of requiring the separate production of the antenna on the one hand and the switch on the other hand, which can necessitate different specific and expensive production machines.

Furthermore, the setting up of the stator/antenna/switch assembly requires separate operations that can lead to a relatively long assembly time and installation of several specific and expensive assembly machines.

Therefore an object of the invention is to overcome these drawbacks of the prior art, providing a reduction in the times and costs of production and assembly of the antenna and switch on the stator.

To this end, a subject of the invention is a control module for a vehicle antitheft lock comprising a stator and a rotor capable of being rotationally driven in the stator by a conforming key that includes an electronic identifier, said module including a support intended to be fitted on the stator and bearing an antenna intended to be connected to an identification unit able to:

- authenticate the electronic identifier of said key by exchanges of signals, and
- authorize the starting of the vehicle when an authorized identifier is detected, characterized in that said support also bears at least one contactless switch able to change switching state when the rotor is rotationally moved.

According to one advantageous embodiment, the support includes:

- a first part forming an antenna-holder implemented in the form of a cylindrical skirt covering the stator, and
- a second part bearing said at least one contactless switch and implemented in the form of a strip secured to the first part.

Preferably, the cylindrical skirt includes a circular groove able to receive the antenna.

Judiciously, the strip includes on its lateral sides at least one latching means able to cooperate with a complementary latching means borne by the stator.

Advantageously, for each contactless switch, an opening forming a housing is arranged in the strip.

Preferably, each contactless switch includes a reed switch able to cooperate with a permanent magnet secured to the rotor to perform a switching action according to the angular position of the rotor.

According to one preferred embodiment, the strip bears at its free end an electrical connection plug, electrically connected on the one hand to the antenna and on the other hand to said at least one contactless switch.

Advantageously, said plug is connected on the one hand to the antenna and on the other hand to said at least one contactless switch by stamped conducting tracks, the connecting ends of which in said plug form connection pins and the other ends of which form pads for contact with on the one hand the antenna and on the other hand the contactless switches.

Preferably, at least one of the conducting tracks includes at its end a U-shaped contact pad, each branch of which forms a pad for contact with a contactless switch.

Advantageously, the strip is surmounted by two lateral flanges defining between them a receiving channel for the conducting tracks and said module comprises an embellisher including a ring covering the groove for receiving the antenna, and a cover-piece closing the receiving channel for said tracks and secured to the ring.

Preferably, the cover-piece includes at its free end a lug cooperating with a conforming indentation provided in the rear wall of said plug.

Another subject of the invention is a vehicle antitheft lock comprising a stator and a rotor capable of being rotationally driven in the stator, and including a control module according to the invention.

BRIEF DESCRIPTION OF THE DRAWINGS

Other features and advantages of the invention will emerge from the following description, given by way of example, without any limiting character, with reference to the accompanying drawings in which.

DETAILED DESCRIPTION

Figure 1:
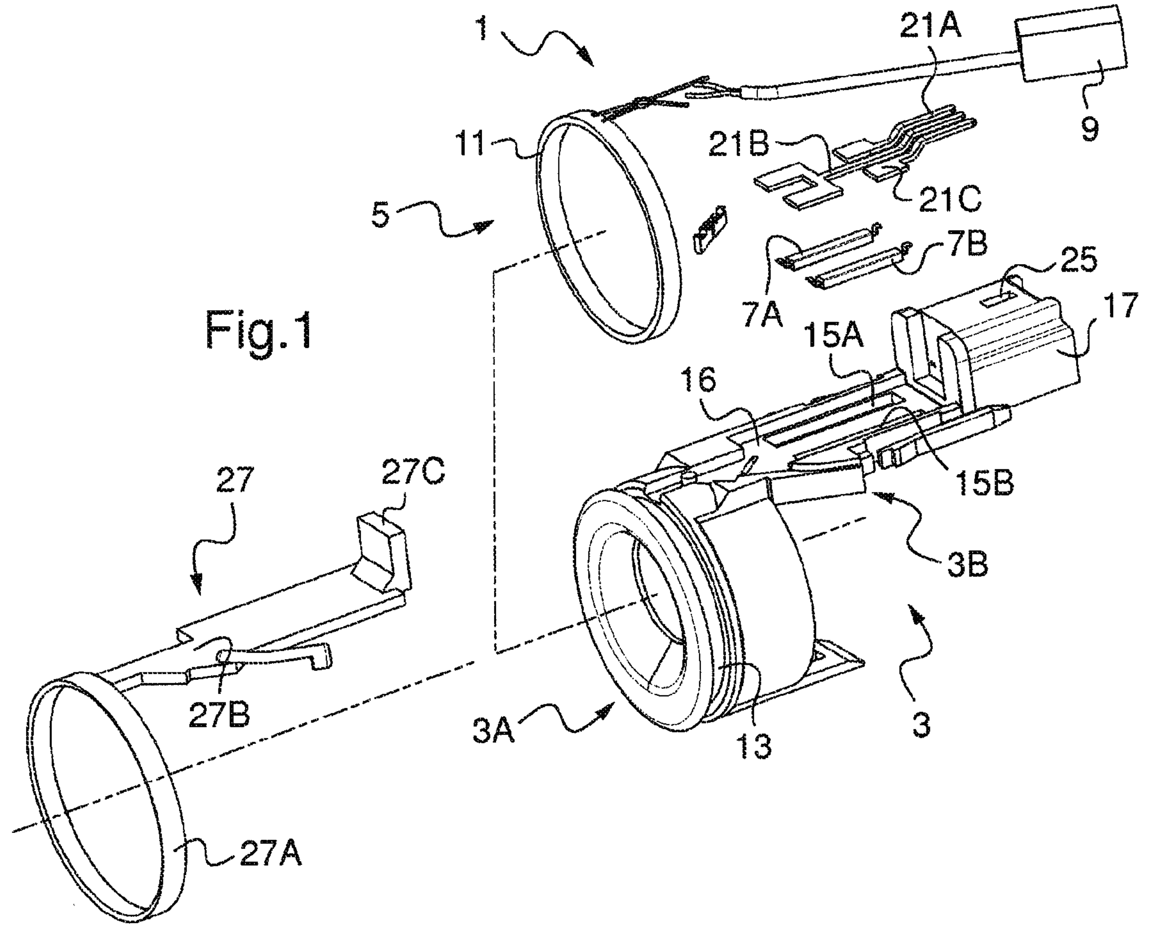
FIG. 1 is an exploded view of a control module according to a first embodiment.

An antitheft lock conventionally comprises a stator and a rotor able to be rotationally driven in the stator, for example by means of a conforming key including an electronic identifier introduced into a key entry arranged on one end of the rotor.

In the example described, the antitheft device is intended to control the starting of the vehicle.

According to the invention, the lock is equipped for this purpose with a control module 1 represented in FIGS. 1 to 3*b*.

This module 1 includes a support 3 intended to be fitted to the stator and bearing both an antenna 5 and at least one contactless switch 7A, 7B, so as to provide for a very simple and very fast setup of the stator/antenna/switch assembly, while reducing the number of components to produce and assemble and thus the production and assembly costs.

The antenna 5 cooperates by exchanges of signals with a transmitter provided, for example, in a key head, not represented.

Moreover, the antenna 5 is electrically connected, for example, by means of a first connection plug 9, to an identification unit, preferably on board the vehicle, and transmits the signals sent to this identification unit.

The identification unit analyses and processes these signals to recognize the electronic identifier, for example in the form of an identification code, and to authenticate, or not authenticate, this code by comparing it with a code in memory, in order to identify an authorized key.

When an authorized code, and in particular an authorized key, is detected, the identification unit then authorizes the starting of the vehicle.

However, while the code is not authenticated, authorization of starting is not ordered.

When starting is authorized and when the switches 7A, 7B change state due to a rotation of the rotor after the latter is driven by the conforming key, a vehicle control unit (not represented) runs the engine starting phases or the powering of the accessories, according to the angular position of the rotor.

Specifically, provision can be made for the rotor to be placed successively in the following angular positions, respectively associated with a command:

- a "STOP" position for stopping the engine,
- a "CONTACT" position for switching on the vehicle engine and thus powering the electrical equipment of the vehicle, and
- a "START" position for powering the starter of the vehicle and thus starting the engine.

Of course, provision can also be made for an "ACCESSORIES" position for powering the vehicle accessories.

According to the embodiment described, the support 3 advantageously has:

- a first part forming an antenna-holder implemented in the form of a cylindrical skirt 3A covering the stator, and
- a second part bearing the contactless switches 7A, 7B implemented in the form of a strip 3B secured to the cylindrical skirt 3A, so as to form the support 3 in a single piece.

In the example illustrated, the cylindrical skirt 3A includes a groove 13 receiving the antenna implemented, for example, in the form of a coil wound around an independent support 11.

This groove 13 is for example arranged on one end of the cylindrical skirt 3A receiving the end of the rotor which bears the key entry, such that when the key is introduced therein, the antenna 5 is positioned close to the key transmitter for a better exchange of signals.

As far as the strip 3B is concerned, it judiciously includes at least one latching means on its lateral sides cooperating with a complementary latching means borne by the stator, for fixing the control module 1 on the stator.

Furthermore, for each contactless switch 7A, 7B, a corresponding opening 15A, 15B forming a housing is advantageously arranged in the strip 3B.

As FIG. 1 illustrates, these openings 15A, 15B are preferably arranged in a receiving channel 16, defined by two lateral flanges which surmount the strip 3B.

Preferably, each contactless switch 7A, 7B is a low-current switch and includes a reed switch, so as to allow the use of the control module 1 in a vehicle having a low-current switching architecture.

The term "low current" indicates a current for broadcasting, collecting or exchanging information in the form of electrical signals. The currents concerned are sometimes very low (a few μA to a few mA).

These reed switches are arranged on the strip 3B, with their longitudinal axis substantially parallel to the longitudinal axis of the rotor, and cooperate with a permanent magnet (not represented) secured to the rotor, so as to be sensitive to the position of the rotor after the rotor is rotationally driven by the key, in order to carry out the switching corresponding to the angular position of the rotor.

According to one preferred embodiment, the permanent magnet is borne by the front face of a cam secured to the free end of the rotor, inside the stator. This magnet can be a ferrite magnet or one made of an alloy of neodymium, iron and boron or other, and can be set up in a cavity provided in the cam.

Thus, when the rotor rotates, the detection of a magnetic field produced close to one or more reed switches has the effect of closing the reed switches, thus establishing a current, so as to run an associated command.

To this end, the reed switches 7A, 7B are connected by their pins to a second connection plug 17, providing an electrical connection with the control unit, not represented, so as to switch the associated contacts when the reed switches are closed, and thus transmit a corresponding signal to the control unit.

Advantageously, the second connection plug 17 is borne by the support 3, more specifically at the free end of the strip 3B.

Preferably, the connection plug 17 is secured to the support 3, for example by overmolding, so as to produce as a single piece the support 3 and the second connection plug 17.

Figure 2:
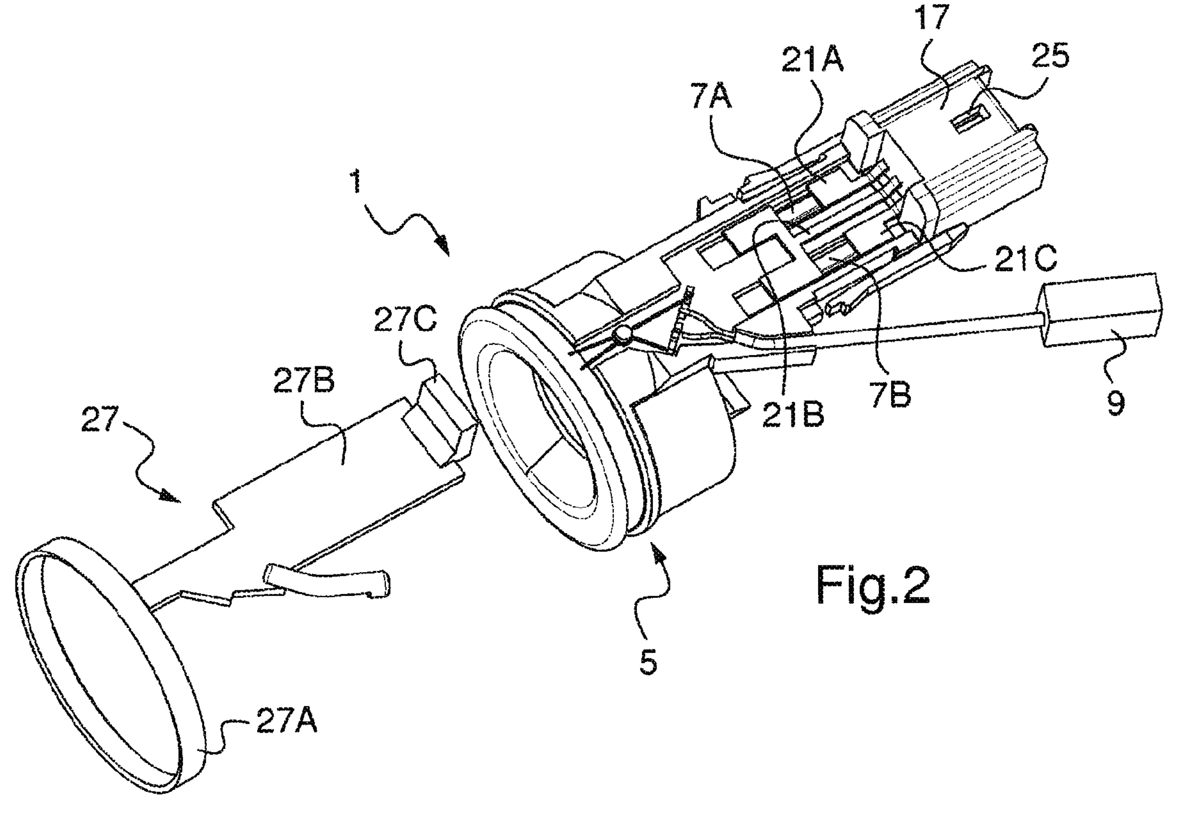
FIG. 2 is a perspective view of assembled elements of the control module of FIG. 1.

As observed in FIGS. 1 and 2, the connection plug 17 is advantageously connected to the reed switches 7A, 7B via stamped conducting tracks 21A, 21B, 21C received in the receiving channel 16.

These tracks 21A to 21C have first connecting ends in the connection plug 17 which form connection pins and second ends which form pads for contact with the switches 7A, 7B.

Preferably, the central track 21B includes at its end a contact pad, for example U-shaped, which includes two branches, each forming a pad for contact with a pin of each reed switch 7A, 7B. The two other tracks 21A, 21C are connected to the other pin of each reed switch 7A, 7B respectively.

Thus, according to one example embodiment, in the "Stop" position, which corresponds to the relative position of the lock and switches after assembly, provision can be made for the magnet to be away from the reed switches 7A, 7B and for these reed switches to both be open. Therefore no electrical signal is transmitted by the connection plug 17 to the control unit.

The key can then be turned by a first angle to make the rotor enter the "Contact" position. In this case, the magnet is close to a first reed switch which closes under the effect of the magnetic field. Two contacts of the connection plug 17 are then switched and transmit an electrical signal to the control unit which powers the electrical equipment.

The key can then be turned by a second angle to make the rotor enter the "Start" position. During this rotation, the first reed switch remains closed and a second reed switch closes, switching the three contacts of the connection plug 17. The electrical signal transmitted to the control unit carries out the starting of the engine.

From this position, the key can be turned in a reverse direction to return to the position in which the starter is no longer powered but the engine is on, the second reed switch being open, the magnet having moved away.

Then, by an additional rotation in the same direction, the key can be brought back to the “Stop” position in which both reed switches 7A, 7B are open.

Of course, when the rotor occupies the fourth “Accessories” position, a third reed switch can be used according to the same principle.

Preferably, the connections between the contacts of the connection plug and the pins of the reed switches 7A, 7B are achieved by soldering.

As a variant, provision can be made for the reed switches 7A, 7B to be connected to the second connection plug 17 via a printed circuit board.

The reed switches 7A, 7B are then soldered on the board which has two slots into which the reed switches 7A, 7B are fitted, and the contacts of the connection plug 17 are, as far as they are concerned, soldered close to one side of this board.

Once the connections are made, the board/reed switch/contacts assembly is inserted into a space formed on the support 3, for example the receiving channel 16.

Moreover, the second connection plug 17 can be fixed to the stator by a rail and slider arrangement substantially parallel to the longitudinal axis of the rotor. More specifically, the connection plug 17 includes on each of its sides a rib which comes to fit into a corresponding rail arranged on the stator 1.

Preferably, the second connection plug 17 includes at its end opposite the contacts a latching device 25 on the stator, formed by a hole which comes to latch on a corresponding resilient strip (not represented) arranged on the stator, at the end of the travel of the ribs in their respective rail.

Figure 3A:
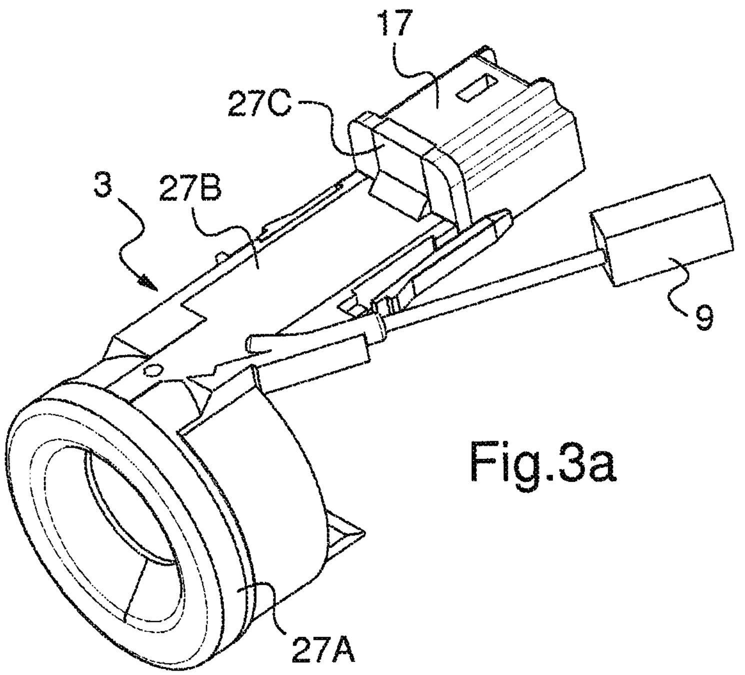
FIG. 3*a* illustrates the assembled control module of FIGS. 1 and 2.
Figure 3B:
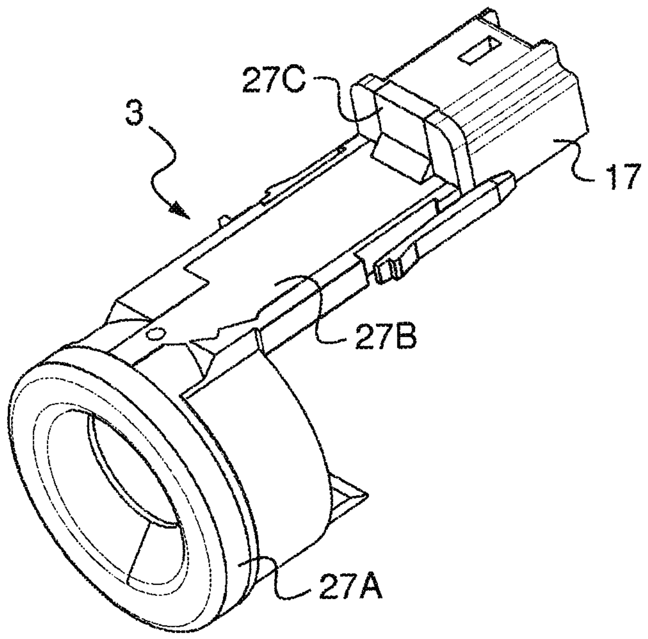
FIG. 3*b* illustrates an assembled control module according to a second embodiment.

According to one preferred embodiment represented in FIG. 3B, the first connection plug 9 is integrated with the second connection plug 17 so as to form a common connection plug.

The connection plug 17 is then connected both to the antenna 5 and to the reed switches 7A, 7B, such that the electrical connections between on the one hand the antenna 5 and the identification unit and on the other hand the contactless switches 7A, 7B and the control unit are achieved simultaneously.

In that case, two additional stamped conducting tracks can be provided, not represented, to electrically connect the connection plug 17 to the antenna 5.

In a manner similar to the tracks 21A to 21C, the additional tracks have first connecting ends in the connection plug 17 which form connection pins and second ends which form pads for contact with the ends of the antenna 5.

As a variant, provision can be made for the antenna 5 to be connected to the connection plug 17 via a printed circuit board.

Moreover, as observed in FIGS. 1 to 3*b*, the control module 1 advantageously includes an embellisher 27 fixed on the support 3, so as to complete the aesthetic quality of the control module 1.

The embellisher 27 is preferably made of plastic and is fixed on the control module 1 by clipping or overmolding.

More specifically, this embellisher 27 includes a ring 27A covering the groove 13, and a cover-piece 27B closing the receiving channel 16 and secured to the ring 27A.

Lastly, this embellisher 27 includes a lug 27C, preferably at the free end of the cover-piece 27B, cooperating with an indentation provided in the rear wall of the second connection plug 17, so as to hide the whole of the visible surface of the control module 1, as represented in FIGS. 3*a*, 3*b*.

It is therefore understood that such a control module provides for reducing the number of mechanical components to be fitted on the lock and to reduce assembly time.

The result of this is a significant reduction in production and assembly costs.

Of course, it is clear that such a control module according to the invention can equip any vehicle antitheft lock, of the type comprising a stator and a rotor capable of being rotationally driven in the stator.

The invention claimed is:

1. A control module for a vehicle antitheft lock comprising:
- a stator;
- a rotor capable of being rotationally driven in the stator by a conforming key that includes an electronic identifier;
- a support configured to be fitted on the stator and bearing an antenna connected to an identification unit able to:
  - authenticate the electronic identifier of said key by exchanges of signals, and
  - authorize starting of the vehicle when an authorized identifier is detected,
- wherein said support also bears at least one contactless switch able to change switching state when the rotor is rotationally moved,
- wherein the support comprises:
  - a first part forming an antenna-holder implemented in the form of a cylindrical skirt covering the stator; and
  - a second part bearing said at least one contactless switch and implemented in the form of a strip secured to the first part,
- wherein the strip bears at a free end an electrical connection plug, electrically connected on the one hand to the antenna and on the other hand to said at least one contactless switch, and
- wherein said plug is connected on the one hand to the antenna and on the other hand to said at least one contactless switch by stamped conducting tracks, the connecting ends of which in said plug form connection pins and the other ends of which form pads for contact with on the one hand the antenna and on the other hand the contactless switches.

2. The module as claimed in claim 1, wherein the cylindrical skirt includes a circular groove able to receive the antenna.

3. The module as claimed in claim 1, wherein the strip includes on lateral sides, at least one latching means able to cooperate with a complementary latching means borne by the stator.

4. The module as claimed in claim 1, wherein for each contactless switch, an opening forming a housing is arranged in the strip.

5. The module as claimed in claim 1, wherein each contactless switch includes a reed switch able to cooperate with a permanent magnet secured to the rotor to perform a switching action according to the angular position of the rotor.

6. The module as claimed in claim 1, wherein at least one of the conducting tracks includes at one of the other ends a U-shaped contact pad, each branch of which forms a pad for contact with a contactless switch.

7. The module as claimed in claim 1, wherein characterized in that the strip is surmounted by two lateral flanges defining between them a receiving channel for the conducting tracks and wherein said module comprises an embellisher including: a ring covering the groove for receiving the antenna, and a cover-piece closing the receiving channel for the tracks and secured to the ring.

8. The module as claimed in claim 7, wherein the cover-piece includes at a free end a lug cooperating with a conforming indentation provided in the rear wall of said plug.

9. A vehicle antitheft lock comprising:

a stator;

a rotor capable of being rotationally driven in the stator by a conforming key that includes an electronic identifier; and a control module comprising a support configured to be fitted on the stator and bearing an antenna connected to an identification unit able to:

authenticate the electronic identifier of said key by exchanges of signals, and authorize starting of the vehicle when an authorized identifier is detected, wherein said support also bears at least one contactless switch able to change switching state when the rotor is rotationally moved, wherein the support comprises:

a first part forming an antenna-holder implemented in the form of a cylindrical skirt covering the stator; and a second part bearing said at least one contactless switch and implemented in the form of a strip secured to the first part, wherein the strip bears at a free end an electrical connection plug, electrically connected on the one hand to the antenna and on the other hand to said at least one contactless switch, and wherein said plug is connected on the one hand to the antenna and on the other hand to said at least one contactless switch by stamped conducting tracks, the connecting ends of which in said plug form connection pins and the other ends of which form pads for contact with on the one hand the antenna and on the other hand the contactless switches.

10. The vehicle antitheft lock of claim 9, wherein the cylindrical skirt includes a circular groove able to receive the antenna.

* * * * *